Jan. 12, 1932.  E. VAN BUREN  1,841,226
WINDOW SCREEN AND SHUTTER SET
Filed March 30, 1931
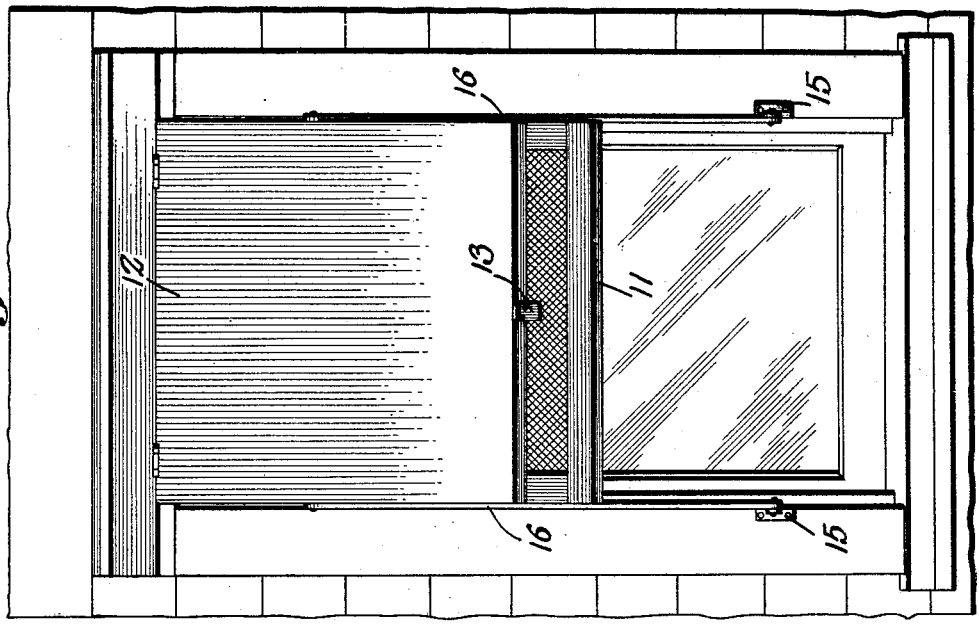
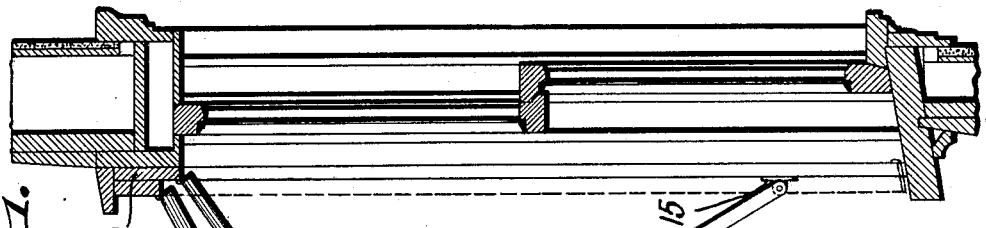
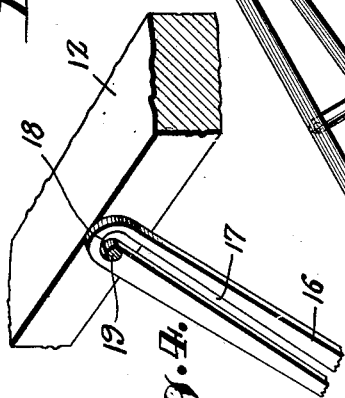
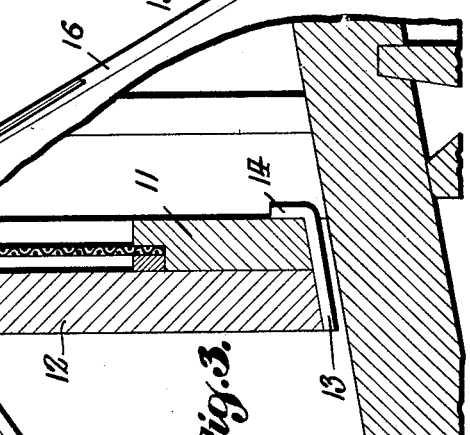
E. Van Buren INVENTOR
BY Victor J. Evans and Co. ATTORNEYS Patented Jan. 12, 1932

1,841,226

UNITED STATES PATENT OFFICE

EBER VAN BUREN, OF VANDERBILT, MICHIGAN

WINDOW SCREEN AND SHUTTER SET

Application filed March 30, 1931. Serial No. 526,411.

The present invention contemplates a novel construction of means for mounting a window screen and shutter upon a window frame, whereby either or both can be conveniently swung outwardly to an open position, together with means for supporting the shutter in its elevated position independently of the screen.

Another object of the invention resides in the provision of a novel construction of means for holding the shutter and screen fixed relatively in their closed positions.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a vertical sectional view through a window construction showing the manner of opening the shutter and screen, and the manner of supporting the shutter in its elevated opened position.

Figure 2 is a view taken at a right angle to Figure 1 showing the screen and shutter closed.

Figure 3 is an enlarged fragmentary sectional view showing how the screen and shutter are held fixed relatively in their closed positions.

Figure 4 is a fragmentary detail view of the shutter supporting means.

Referring to the drawings in detail 10 indicates a window frame of ordinary well known construction, and hingedly mounted at the top of this frame is a window screen 11 and a shutter 12. The screen and shutter are so hingedly mounted with relation to each other, that both can be closed and held fixed relatively in face to face contact in any suitable manner. For this purpose, however, I preferably employ a resilient clamp 13 formed with a flange 14, so that when the screen and shutter are in their closed positions as illustrated in Figure 3, the clamp 13 passes beneath the lower edge of the screen with the flange 14 engaging the inner face of the screen to hold it in close contact, and immovable with the shutter 12.

Mounted upon the window frame is a bracket 15 which pivotally supports the adjacent end of a brace bar 16 longitudinally slotted as at 17 from an appropriate point in its length to its outer end. It will be noted upon inspection of Figure 4 that the outer end of the slot is curved as at 18 to provide an offset portion for a purpose to be presently described. Projecting from the shutter 12 is a pin 19 which operates in the slot 17 incident to the opening or closing movements of the shutter, and when the shutter has been fully extended to its opened position, the pin 19 is received by the offset curved portion 18 of the slot 17, and thereby held in its elevated position. There may be two of the brace rods 16 used at opposite sides of the shutter if so desired.

Assuming that the window screen and shutter are in their closed positions, the clamp 13 carried by the lower end of the shutter is associated with the screen in the manner illustrated in Figure 3. In order to open the shutter it is only necessary to move both the screen and shutter outwardly as indicated in Figure 1, and before the shutter reaches the limit of its outward movement, the screen will be separated from the clamp 13. However, both the screen and shutter are moved as a unit outwardly until the pin 19 is received by the curved offset extremity 18 of the slot, in which position the shutter is supported in its open position by the brace bar 16, whereupon the screen can independently gravitate to its normal closed position. When the shutter 12 is released from the bar 16, the screen and shutter are held associated by the clamp 13 in their closed positions. When the screen and shutter are moved to their closed positions, the brace bar 16 folds to its inactive position, parallel with the screen and shutter.

While it is believed that from the foregoing description the nature and advantages of the invention will be apparent, I desire to have it understood that I do not limit myself to what is herein shown or described, and that such changes may be resorted to when desired as fall within the scope of what is claimed.

What is claimed is:

1. In combination, a window screen adapted to be hingedly mounted at the top of a window frame, a shutter hingedly mounted on the frame in advance of said screen, means carried by the lower end of the shutter and adapted to automatically engage the adjacent end of the screen to hold the parts fixed relatively in their closed positions, said shutter being elevated with the screen to its open position, and incidentally separated from said screen, and means mounted on the window frame and connected with the shutter for supporting the latter in its elevated position independently of the screen.

2. In combination, a window screen hingedly mounted at the top of the window frame, a vertically swingable shutter hingedly mounted on the frame in advance of the screen and adapted to be moved therewith to an opened position, a vertically arranged brace bar having its lower end pivotally mounted on the window frame, and a slot and pin connection between the bar and said shutter, to support the latter in its opened position independently of the screen, and to permit said bar to return to its normal vertical position with the shutter when the latter is closed.

3. In combination, a window screen hingedly mounted at the top of the window frame, a vertically swingable shutter hingedly mounted on the frame in advance of the screen and adapted to be elevated therewith to an opened position, a vertically disposed brace bar pivoted at its lower end on the window frame, and slotted from an appropriate point in its length to the outer end thereof, and including an offset portion, and a pin carried by the shutter and movable in said slot, and adapted to be received by the offset portion thereof when said brace bar assumes an angular position with relation to the frame, and to permit said bar to assume its normal position when the shutter is closed.

In testimony whereof I affix my signature.

EBER VAN BUREN.